US008447865B2

(12) United States Patent
Bansal et al.

(10) Patent No.: US 8,447,865 B2
(45) Date of Patent: May 21, 2013

(54) OPTIMAL SOURCE INTERFACE SELECTION

(75) Inventors: Deepak Bansal, Redmond, WA (US); Murari Sridharan, Sammamish, WA (US); Narasimhan Agrahara Venkataramaiah, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 562 days.

(21) Appl. No.: 12/143,748

(22) Filed: Jun. 20, 2008

(65) Prior Publication Data

US 2009/0319667 A1    Dec. 24, 2009

(51) Int. Cl.
*G06F 15/16* (2006.01)
*G06F 9/445* (2006.01)
*H04B 1/38* (2006.01)
*H04W 4/00* (2009.01)

(52) U.S. Cl.
USPC ........... 709/227; 709/218; 455/557; 370/331; 717/178

(58) Field of Classification Search
USPC .................................................. 709/227–230
See application file for complete search history.

(56) References Cited

U.S. PATENT DOCUMENTS

| 6,233,619 | B1 | 5/2001 | Narisi et al. |
| 6,697,806 | B1* | 2/2004 | Cook ..................................... 1/1 |
| 7,065,367 | B2* | 6/2006 | Michaelis et al. ......... 455/452.2 |
| 7,136,364 | B2 | 11/2006 | Saint-Hilaire et al. |
| 7,200,666 | B1 | 4/2007 | Nguyen |
| 7,222,359 | B2* | 5/2007 | Freund et al. ..................... 726/3 |
| 7,380,000 | B2* | 5/2008 | Yaqub et al. .................. 709/224 |
| 2002/0072391 | A1* | 6/2002 | Itoh et al. ....................... 455/557 |
| 2004/0077341 | A1 | 4/2004 | Chandranmenon et al. |
| 2005/0091357 | A1 | 4/2005 | Krantz et al. |
| 2006/0084417 | A1 | 4/2006 | Melpignano et al. |
| 2007/0019670 | A1* | 1/2007 | Falardeau ..................... 370/465 |
| 2007/0030826 | A1 | 2/2007 | Zhang et al. |
| 2007/0211690 | A1* | 9/2007 | van Megen et al. ........... 370/351 |
| 2008/0046542 | A1 | 2/2008 | Sano |
| 2008/0275992 | A1* | 11/2008 | Basty et al. ................... 709/227 |

OTHER PUBLICATIONS

Pierrel, et al., "A Prototype for Policy Driven Control of Heterogeneous Network Access", May 2004, Ericson, pp. 10.
Ylitalo et al., "Dynamic Network Interface Selection in Multihomed Mobile Hosts" Proceedings of the 36th Hawaii International Conference on System Sciences'03, IEEE, 2003, pp. 1-10.

* cited by examiner

*Primary Examiner* — Evans Desrosiers
(74) *Attorney, Agent, or Firm* — L. Alan Collins; Collins & Collins Intellectual, LLC (57) ABSTRACT

Aspects of the subject matter described herein relate to selecting a source interface with which to establish a connection. In aspects, a profile for each network location a host has seen is maintained in a data store. The profile includes information about the network interfaces available to a source host at the network location. This information indicates, among other things, the reliability of each interface of the source host. Based on the profile, an interface is selected with which to establish a connection. If the interface is unsuccessful in establishing the connection, the interface is de-prioritized and another interface may be selected.

16 Claims, 5 Drawing Sheets

OPTIMAL SOURCE INTERFACE SELECTION

BACKGROUND

When a host seeks to establish a connection with another host, multiple connection options may be available on the host seeking to establish the connection. For example, there may be wired and wireless interfaces as well as virtual interfaces such as VPN interfaces, IPv6 transition interfaces such as Teredo, 6to4, and firewall traversal interfaces such as IP over HTTP. With all the options available, selecting an optimal source interface may be challenging.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to selecting a source interface with which to establish a connection. In aspects, a profile for each network location a host has seen is maintained in a data store. The profile includes information about the network interfaces available to a source host at the network location. This information indicates, among other things, the reliability of each interface of the source host. Based on the profile, an interface is selected with which to establish a connection. If the interface is unsuccessful in establishing the connection, the interface is de-prioritized and another interface may be selected.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise.

Exemplary Operating Environment

Figure 1:
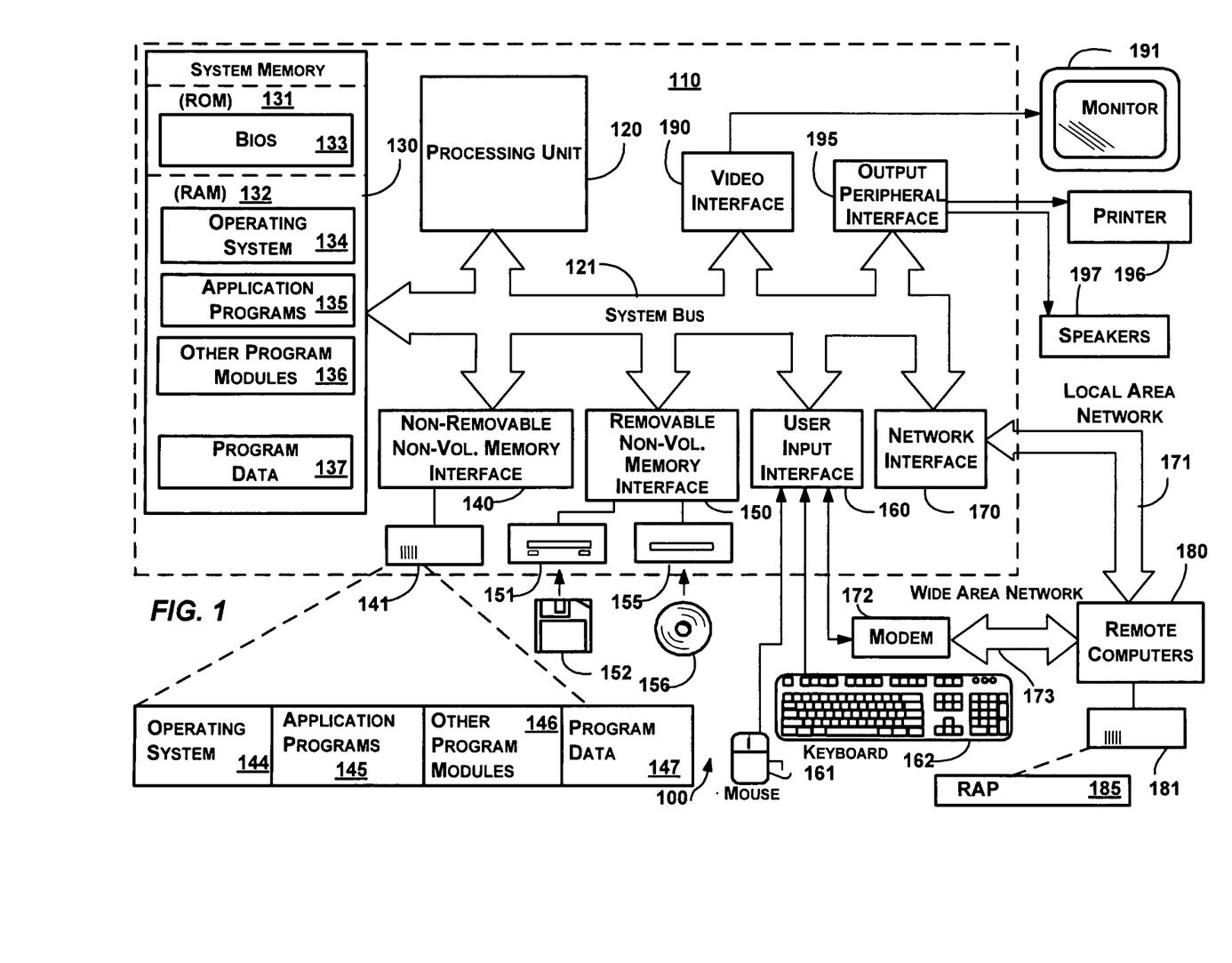
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and non-volatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Interface Selection

Figure 2:
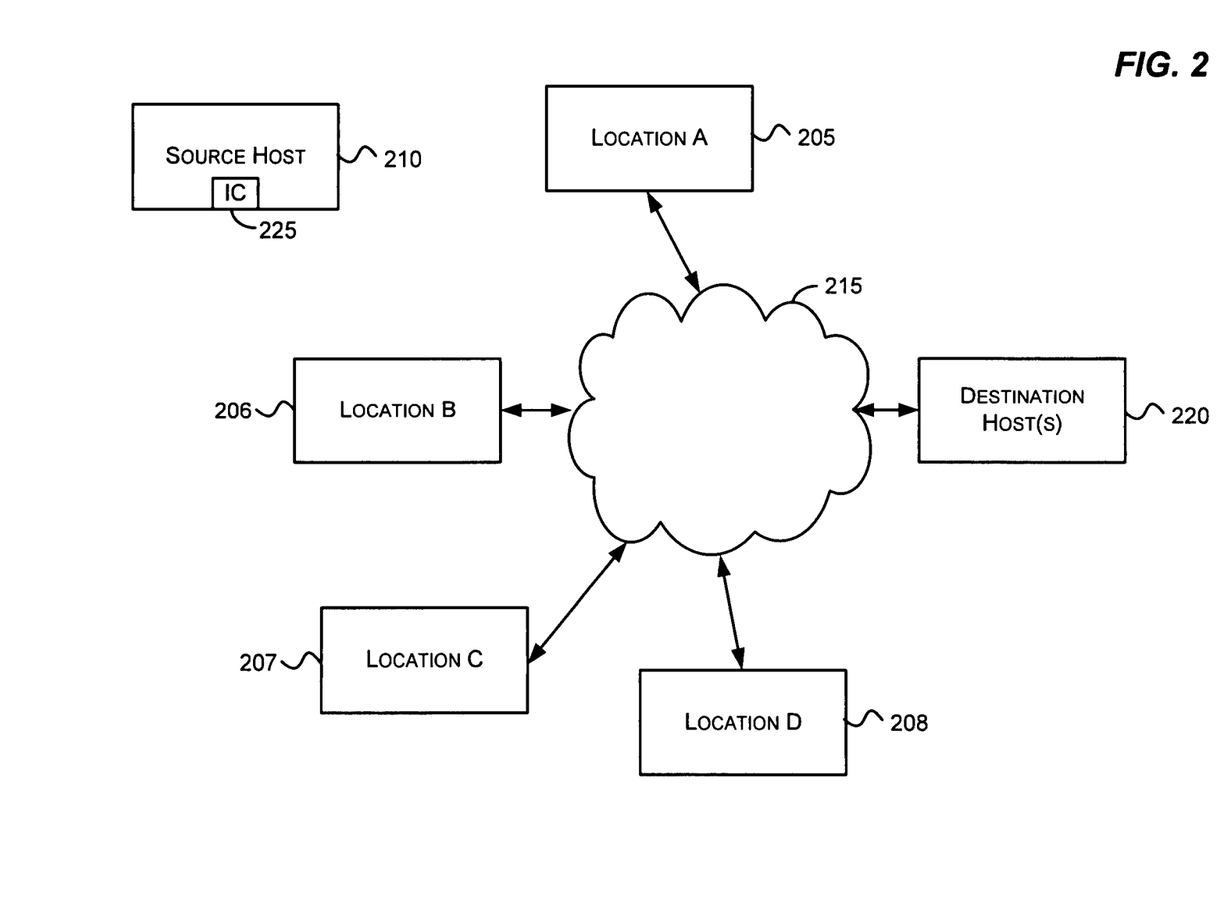
FIG. 2 is a block diagram representing an exemplary environment in which aspects of the subject matter described herein may be implemented.

As mentioned previously, a host seeking to establish a connection with another host may have multiple connection options. FIG. 2 is a block diagram representing an exemplary environment in which aspects of the subject matter described herein may be implemented. The environment may include various locations 205-208, a source host 210, destination host(s) 210, and a network 215, and may include other entities (not shown). The source host 210 may include interface components 225 that are described in more detail in conjunction with FIG. 3.

The various entities may be located relatively close to each other or may be distributed across the world. The various entities may communicate with each other via various networks including intra- and inter-office networks and the network 215.

In an embodiment, the network 215 may comprise the Internet. In an embodiment, the network 215 may comprise one or more local area networks, wide area networks, direct connections, virtual connections, private networks, virtual private networks, some combination of the above, and the like.

The hosts 210 and 220 may comprise one or more computers (e.g., the computer 110 as described in conjunction with FIG. 1). Each host may be capable of executing one or more processes including a communication protocol.

Logically, the locations 205-208 are places at which a host may connect to the network 205. For example, a location may comprise a location at an enterprise network, a home location, a hotel, a coffee shop, an Internet café, a public library, an airport, a cruise ship, a gas station, a restaurant, a grocery store, some other location, and the like.

A location may support certain communication protocols while blocking other protocols. For example, some locations may allow HTTP traffic only while blocking all other forms of network traffic. One enterprise network may allow certain business-oriented network protocols while blocking non business-oriented network protocols while another enterprise location may allow and block other network protocols. A location may support Teredo, 6to4, or some other tunneling protocol. A location may support a virtual private network (VPN) connection while another location may block VPN connections.

A location may be determined in many different ways as will be understood by those skilled in the art. For example, a MAC address of a default gateway may be used to determine a location. As another example, some characteristics about the network may be used to determine location. Other location determining mechanisms may also be used without departing from the spirit or scope of aspects of the subject matter described herein.

A connection interface may comprise a physical interface such as wireless or wired interface, a virtual interface, or the like. A virtual interface may comprise a software component that "appears" to applications and other software components to be a physical interface, but that in reality uses a physical interface to provide connectivity. In "appearing" to be a physical interface, a virtual interface may expose interface elements (e.g., methods, properties, and the like) that allow programs to establish and end connections, send and receive data, gather statistics, and perform other connection-oriented tasks over the virtual interface. Some exemplary virtual interfaces include a VPN interface, a Teredo interface, an HTTP or HTTPS tunnel interface, a dial-up interface, an application interface that allows an application to communicate via a set of one or more ports, a gaming interface that transmits gaming information to other hosts, and the like.

The source host 210 may comprise a computer that may be connected to the network 215 via one or more of the locations 205-208. While a mobile computer may be suited for physically moving from location to location, other computers that are less mobile may also be moved from location to location.

Furthermore, "moving" from one location to another location may involve no physical moving of the computer but instead may involve plugging a network port of the source host into a different port at an enterprise, data center, home, or elsewhere. The different port may allow and deny different connections. "Moving" from one location to another location may involve reconfiguring a network access device to which a computer is connected. For example, a network access device may allow certain traffic during one part of the day while blocking other traffic during another part of the day.

The destination host(s) 220 may comprise any host to which the source host 210 seeks to establish a connection. Although shown as connected at a single location, in other embodiments, these hosts may be located at various different locations that are accessible via the network 215.

To determine an optimal interface based on a location of the source host 210, the source host 210 may maintain information about each location to which the source host 210 has been moved. For example, there are various tunneling protocols including Teredo, 6to4, HTTP tunnel, IPsec, Generic Routing Encapsulation (GRE), Layer 2 Tunneling Protocol (L2TP), Multi-Protocol Label Switching (MPLS), GPRS Tunneling Protocol (GTP), Point-to-Point Tunneling Protocol (PPTP), Virtual Local Area Network (VLAN), Anything in Anything (AYIYA), other tunneling protocols, and the like. Network information such as whether UDP is blocked or available (e.g., for Teredo), the presence or absence of an appropriate proxy (e.g., an HTTP proxy for 6to4 or native IPv6 or IPv4), other network information, and the like may be used to determine whether these protocols are available at a particular location. This information may be stored for subsequent use in determining a protocol to use.

In addition to or instead of information that the source host 210 may discover about a network location, the source host 210 may also use information that is explicitly indicated about the network. For example, the network may periodically broadcast that its router is configured to block certain protocols and/or connectivity mechanisms. As another example, via a user interface or other mechanism, a user, system administrator, or the like may explicitly indicate that certain protocols are or are not to be used at a network location. This explicit information may be stored by the source host 210 in a profile associated with the network location.

The source host 210 may maintain history information about connection attempts per location and interface. For example, the source host 210 may maintain counters of successful and non-successful connections per network location per interface. As other history information, the source host 210 may maintain a connection success rate per each location per interface. History information may be stored in a profile associated with a network location.

The source host 210 may also maintain connectivity success per application, application type, and/or per protocol. For example, a particular application may not be able to establish a connection at a particular location using a given protocol, but may be able to establish a connection at the location using another protocol. As another example, applications that use HTTP for connectivity may be able to establish a connection at a particular location, while applications that use some other protocol at the location may not be able to establish a connection.

The source host 210 may store the network information it maintains about a location in a profile that can be located based on the location. When the source host 210 is moved to a new location, the source host 210 may load the profile and determine an optimal interface to use based on the information stored in the profile. This profile may then be updated in response to additional information gathered while the source host 210 is at the location.

In one embodiment, each interface that the source host 210 supports may be associated with a value that represents a priority for the interface. For example, interfaces with a higher value may have a higher priority than interfaces with a lower value. When the source host 210 attempts to use an interface to establish a connection, the source host 210 may attempt to use the highest priority interface unless another interface is requested. When more than one interface has the highest priority, speed, security, latency, or some other characteristic may be used to determine which interface to use.

In one embodiment, priority may be based solely on reliability. In this embodiment, the more reliable an interface is, the higher priority it has.

In another embodiment, priority may be based on factors in addition to reliability. For example, priority may be based on reliability and speed, reliability and security, reliability and cost, reliability, speed, and security, and so forth.

The algorithm that prioritizes interfaces may be hard-coded, user-defined, or some mix of hard-coded and user-defined. In a hard-coded prioritization algorithm, once the algorithm has been shipped, it may not be modified without sending a patch or other update to the algorithm.

In a user-defined prioritization algorithm, for example, a system administrator or the like may define or select an algorithm by which interfaces are to be prioritized. When the source host 210 determines what interface to use, the source host 210 may execute this user-defined algorithm. A user-defined algorithm may have additional information about interfaces that are available at a particular location. For example, the algorithm may indicate that only HTTP is available at the location or that a certain interface is not available at the location. As another example, the algorithm may take into account network messages that indicate the capabilities of the network.

In another example, the prioritization algorithm may ship as a hard-coded algorithm that a system administrator or the like may subsequently modify or replace.

In another embodiment, each interface that the source host 210 supports may be assigned a Boolean value that represents whether the interface is reliable. If the interface is not reliable, the source host 210 may take this into consideration when determining whether to use the interface. For example, the source host 210 may refrain from using an interface that is not reliable unless an application will only make use of that interface.

An interface that the source host 210 selects to use for a connection may fail when a connection attempt is made. If an attempt to establish a connection via an interface fails, the interface may be de-prioritized and the next highest priority interface may be selected.

In one embodiment, information regarding interfaces may be associated with a time to live. After the time to live has expired, a process may determine whether the information is still valid. For example, an interface may not work for a period of time but may come back into service after a while.

In another embodiment, a background process may periodically attempt to re-evaluate interfaces that have been marked as unreliable. If the background process is able to establish a connection using the interface, the background process may mark the interface as reliable and/or may increase a priority associated with the interface.

Although the environment described above includes a source host, four locations, a destination host, and a network 215, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
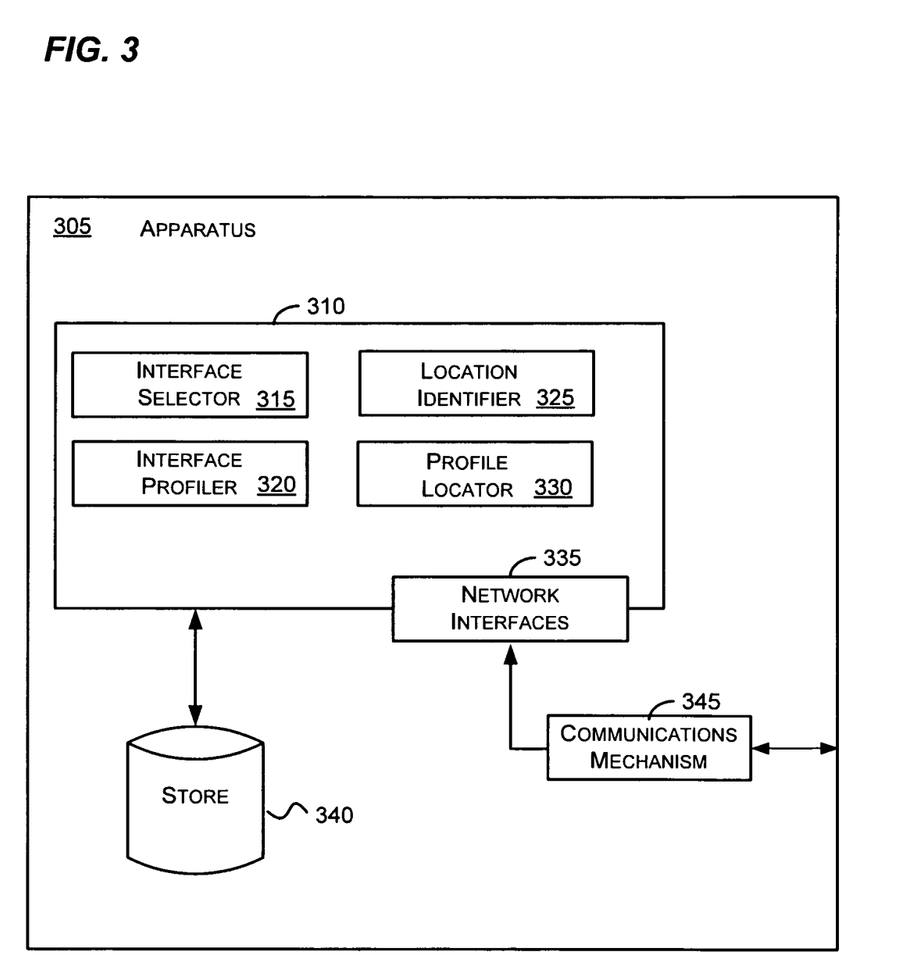
FIG. 3 is a block diagram that represents components of an exemplary apparatus configured in accordance with aspects of the subject matter described herein.

FIG. 3 is a block diagram that represents components of an exemplary apparatus configured in accordance with aspects of the subject matter described herein. The components illustrated in FIG. 3 are exemplary and are not meant to be all-inclusive of components that may be needed or included. In other embodiments, the components and/or functions described in conjunction with FIG. 3 may be included in other components (shown or not shown) or placed in subcomponents without departing from the spirit or scope of aspects of the subject matter described herein. In some embodiments, the components and/or functions described in conjunction with FIG. 3 may be distributed across multiple devices (e.g., two or more of the entities illustrated in FIG. 2).

Turning to FIG. 3, the apparatus 305 may include interface components 310, a store 340, and a communications mechanism 345. The interface components 310 may include an interface selector 315, an interface profiler 320, a location identifier 325, a profile locator 330, and network interfaces 335. The interface components 310 correspond to the interface components 225 of the source host 210 of FIG. 2.

The communications mechanism 345 allows the apparatus 305 to communicate with other entities shown in FIG. 2. The communications mechanism 345 may be a network interface or adapter 170, modem 172, or any other mechanism for establishing communications as described in conjunction with FIG. 1. The communications mechanism 345 may be attached to a network at a location.

The store 340 is any storage media capable of storing profiles related to network locations. A separate profile may be stored per network location. A profile may include any information about a network location described previously.

The location identifier 325 is operable to determine a network location at which the apparatus 305 is connected. The location identifier 325 may determine a network location by identifying a signature associated with the network. Determining a signature of the network may involve determining a set of one or more characteristics regarding the network that distinguish the network from other networks to which the source host has been connected. As output, the location identifier 325 may provide a network identifier associated with the network location.

The profile locator 330 is operable to obtain a profile associated with the network location. The profile may be located via the location identifier provided by the location identifier 325. The profile may include reliability information of establishing connections at the network location via the plurality of network interfaces.

The interface selector 315 is operable to determine one of the network interfaces 335 to use based at least in part reliability of the network interface as indicated in the profile. The interface selector 315 may also use other information (e.g., characteristics of an application such as preference or requirement, protocols allowed on the network, availability of a proxy, an explicit intent to use an interface from the application, cost of using an interface, and so forth) in determining a network interface to use in establishing the connection. If after selecting the network interface, the apparatus 305 is unable to establish a connection, the network interface may be de-prioritized and another network interface may be selected by the interface selector 315.

The interface profiler 320 is operable to gather ongoing information including reliability and other information of the network interfaces 335 as attempts to connect via the network interfaces 335 are made. The interface profiler 320 may also periodically attempt to determine whether an interface that has been marked as unreliable is usable to establish a connection with other hosts. The interface profiler 320 may also be implemented to collect explicit information from applications. One way in which the interface profiler 320 may determine whether an interface that has been marked as unreliable is now available is to attempt neighbor discovery using the interface.

The network interfaces 335 may include one or more physical and/or virtual interfaces as described previously.

Figure 4:
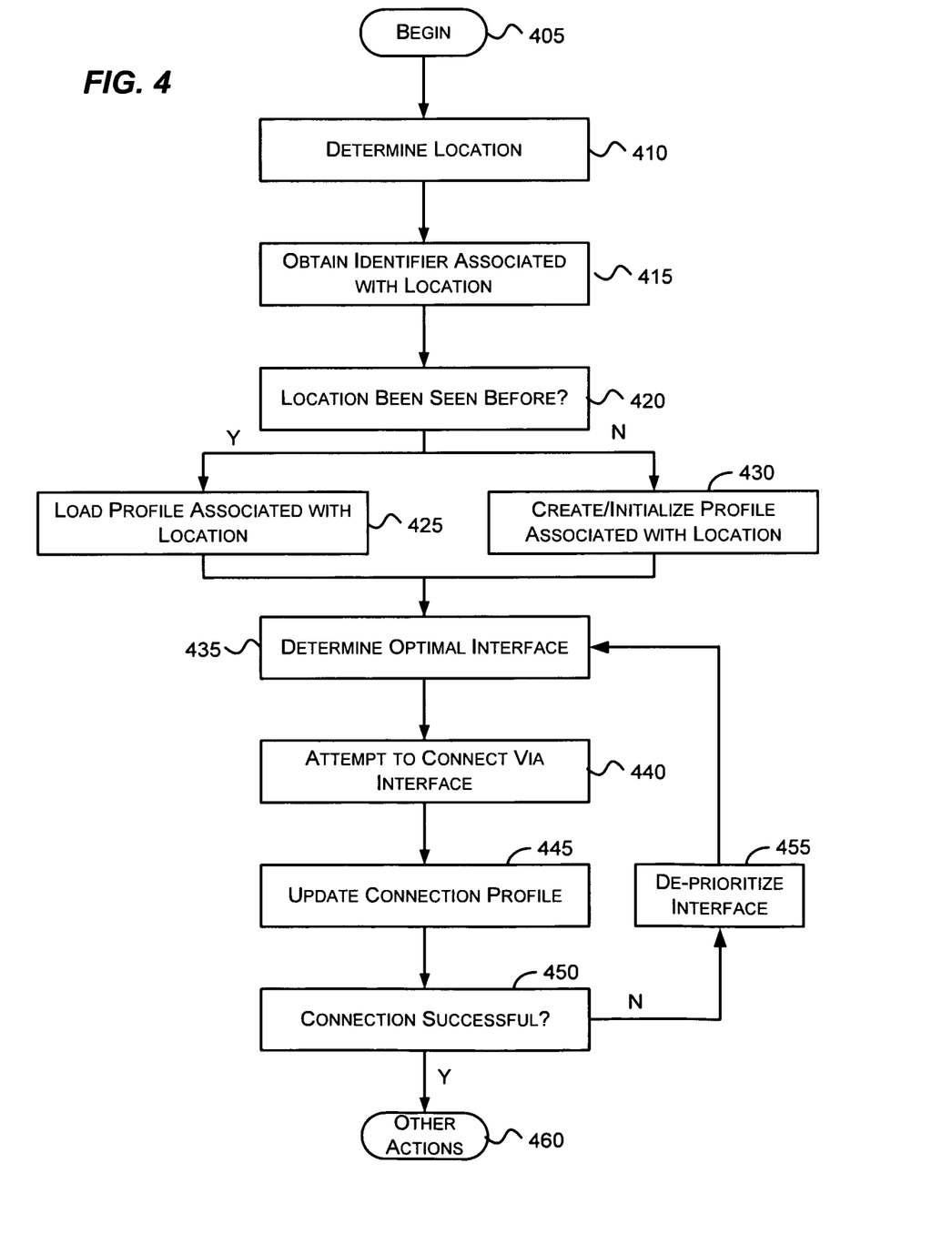
FIG. 4 is a flow diagram that generally represents exemplary actions that may occur in determining an optimal interface to use in accordance with aspects of the subject matter described herein.
Figure 5:
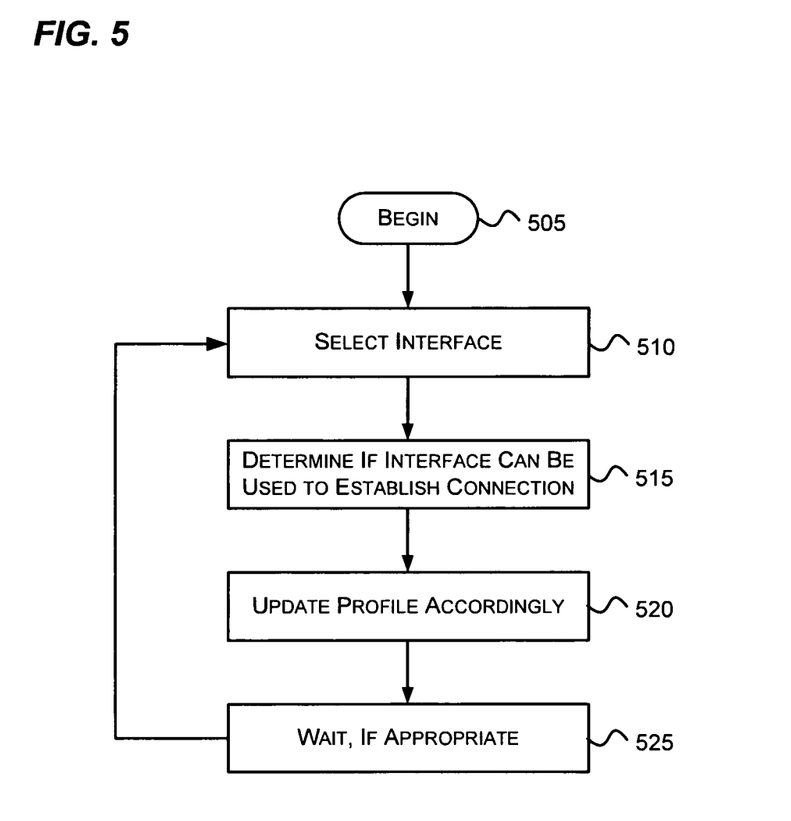
FIG. 5 is a flow diagram that generally represents exemplary actions that may occur in determining whether an interface may be used to establish a connection in accordance with aspects of the subject matter described herein.

FIGS. 4-5 are flow diagrams that generally represent actions that may occur in accordance with aspects of the subject matter described herein. For simplicity of explanation, the methodology described in conjunction with FIGS. 4-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents exemplary actions that may occur in determining an optimal interface to use in accordance with aspects of the subject matter described herein. At block 405, the actions begin.

At block 410, a determination is made as to the network location to which a device is attached. For example, referring to FIG. 3, the location identifier 325 may determine a network location to which the apparatus 305 is attached. Determining the network location may involve determining a signature of the network as has been described previously.

If network location cannot be reliably determined, other information gathered at or known about the location may be used to select an interface. For example, information such as whether UDP is blocked or available (e.g., for Teredo), the presence or absence of an appropriate proxy (e.g., an HTTP proxy for 6to4 or native IPv6 or IPv4), other network information, and the like may be used to select an interface.

At block 415, an identifier associated with the network location is obtained. For example, referring to FIG. 3, the location identifier 325 may generate or provide an identifier associated with the network location.

At block 420, a determination is made as to whether the source host has been located at (e.g., whether it has "seen") the network location before. If so, the action continue at block 425; otherwise, the actions continue at block 430. For example, referring to FIG. 3, the profile locator 330 may attempt to retrieve a profile from the store 340 based on an identifier provided by the location identifier 325. If no profile is found, the profile locator 330 may determine that the apparatus 305 has not been located at the network location before.

At block 425, the profile associated with the network location is loaded. For example, referring to FIG. 3, the profile locator 330 retrieves a profile from the store 340 based on the identifier provide by the location identifier 325.

At block 430, a profile for the location is created and initialized. For example, referring to FIG. 3, the profile locator 330 may create and initialize a profile for the network location. The initialization may involve, for example, indicating that each of the network interface is available for establishing a connection with a network. As information is collected regarding an interface, this information may be stored in the profile.

At block 435, an optimal interface is determined. For example, referring to FIG. 3, the interface selector 315 may select the most reliable of the network interface 335 based on the profile. Note that if all of the interfaces are marked as reliable that other information may be used in selecting a network interface.

At block 440, there is an attempt to establish connectivity via the network interface. For example, referring to FIG. 3, an application may attempt to establish a connection via the selected network interface.

At block 445, the profile is updated based on the resulting connectivity. For example, referring to FIG. 3, the interface profiler 320 may store information corresponding to the result attempting to establish a connection via the selected network interface.

At block 450, a determination is made as to whether the connection was successful. If so the actions continue at block 460; otherwise, the actions continue at block 455.

At block 455, the interface is de-prioritized and the actions associated with blocks 435-450 are performed again in an attempt to find a network interface with which to establish a connection.

At block 460, other actions, if any, are performed.

In another embodiment, if a connection attempt via an interface (e.g., block 440) is unsuccessful, the following actions may occur:

1. The profile may be updated as described in conjunction with block 445 and the interface may be de-prioritized as described in conjunction with block 455; and 2. Then the algorithm may stop or other actions 460, if any, may be performed without looping back to block 435.

When the algorithm described in conjunction with FIG. 4 is performed again, this algorithm may then benefit from the updated profile.

FIG. 5 is a flow diagram that generally represents exemplary actions that may occur in determining whether an interface may be used to establish a connection in accordance with aspects of the subject matter described herein. The actions described in conjunction with FIG. 5 may be performed by a background thread, for example, that awakes periodically to determine if a connection that has been marked as unreliable can now be used to establish a connection.

At block 510, an interface that is marked as unreliable is selected. For example, referring to FIG. 3, the interface selector 315 selects an IPv6 protocol interface to determine whether it can be used to establish a connection.

At block 515, a determination is made as to whether the selected interface may be used to establish a connection. For example, referring to FIG. 3, the interface profiler 320 may attempt to discover neighbors via the selected interface. As another example, the determination may be influenced by policies and/or application needs.

At block 520, the profile is updated accordingly. For example, referring to FIG. 3, the interface profiler 320 updates the profile to reflect the result of its attempt.

At block 525, a pause may occur if appropriate. As mentioned previously, the actions associated with FIG. 5 may be executed on a periodic basis. If all of the "bad" interfaces have already been tried, a process may wait for a period of time before retrying the interfaces.

After block 525, the actions continue at block 510.

As can be seen from the foregoing detailed description, aspects have been described related to selecting a source interface. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method comprising:
   determining a network location to which a source host is communicatively attached, wherein the source host is communicatively coupled to a network via the network location, and wherein the network location is one of one or more network locations that are each configured to communicatively couple at least one host to the network, and wherein the source host comprises a plurality of communications mechanisms;
   determining whether the source host was previously communicatively attached to the network location;
   when it is determined, based at least in part on a profile associated with the network location, that the source host was previously communicatively attached to the network location, then determining one of the plurality of communications mechanisms to use to establish a connection between the source host and a destination host via the one of the plurality of communications mechanisms and the network location and the network, wherein the profile comprises counts of successful and failed connections attempted via the network location by various of the plurality of applications;
   when it is determined, based at least in part on a newly created profile associated with the network location, that the source host was not previously communicatively attached to the network location, determining another of the plurality of communications mechanisms to use to establish the connection between the source host and the destination host via the another of the plurality of communications mechanisms and the network location and the network; and
   wherein the method is performed by a computer.

2. The method of claim 1, wherein the plurality of communications mechanisms comprises a physical network interface adapter or a modem.

3. The method of claim 1, wherein the profile comprises counts of successful and failed connections attempted by each of the plurality of communications mechanisms via the network location.

4. The method of claim 1, wherein the profile comprises indications of absence or presence of a proxy at the network location.

5. The method of claim 1, wherein the profile comprises indications of one or more protocols that are allowed or blocked at the network location.

6. The method of claim 1, further comprising associating a priority with each of the plurality of communications mechanisms.

7. The method of claim 6, wherein the priority associated with a communications mechanism is based solely on a reliability of the communications mechanism.

8. The method of claim 6, wherein the priority associated with a communications mechanism is based on reliability of the communications mechanism and at least one other characteristic associated with the communications mechanism.

9. At least one computer storage device having computer-executable instructions that, when executed by a computer, cause the computer to perform actions comprising:
   determining a network location to which a source host is communicatively attached, wherein the source host is communicatively coupled to a network via the network location, and wherein the network location is one of one or more network locations that are each configured to communicatively couple at least one host to the network, and wherein the source host comprises a plurality of applications;
   determining whether the source host was previously communicatively attached to the network location;
   when it is determined, based at least in part on a profile associated with the network location, that the source host was previously communicatively attached to the network location, then determining one of the plurality of communications mechanisms to use to establish a connection between the source host and a destination host via the one of the plurality of communications mechanisms and the network location and the network, wherein the profile comprises counts of successful and failed connections attempted via the network location by various of the plurality of communications mechanisms; and
   when it is determined, based at least in part on a newly created profile associated with the network location, that the source host was not previously communicatively attached to the network location, determining another of the plurality of communications mechanisms to use to establish the connection between the source host and the destination host via the another of the plurality of communications mechanisms and the network location and the network.

10. The at least one computer storage device of claim 9, wherein the profile comprises counts of successful and failed connections attempted by each of the plurality of communications mechanisms via the network location.

11. The at least one computer storage device of claim 10, wherein the plurality of communications mechanisms comprises a physical network interface adapter or a modem.

12. The at least one computer storage device of claim 9, wherein the profile comprises indications of absence or presence of a proxy at the network location.

13. The at least one computer storage device of claim 9, wherein the profile comprises indications of one or more protocols that are allowed or blocked at the network location.

14. The at least one computer storage device of claim 13, wherein the priority associated with a communications mechanism is based solely on a reliability of the communications mechanism.

15. A computing device and at least one software module comprising:
   a location identifier configured to identify a network location to which the apparatus is communicatively attached, wherein the apparatus is communicatively coupled to a network via the network location, and wherein the network location is one of one or more network locations that are each configured to communicatively couple at least one apparatus to the network;
   a plurality of communications mechanisms of the apparatus;
   a profile locator configured to obtain a profile associated with the network location, the profile including information including indications of reliability of establishing connections via at least one of the plurality of communications mechanisms, wherein the profile comprises counts of successful and failed connections attempted via the network location by various of the plurality of communications mechanisms; and
   an interface selector configured to determine, based at least in part on reliability of the communications mechanism as indicated in the profile, a communications mechanism of the plurality of communications mechanisms to use to establish a connection between the apparatus and a destination apparatus via the communications mechanism and the network location and the network.

16. The computing device and at least one software module of claim 15, further comprising an interface profiler configured to obtain at least reliability information regarding at least successful and failed connections attempted by each of the plurality of communications mechanisms via the per network location.

\* \* \* \* \*